United States Patent [19]

Simon et al.

[11] Patent Number: 4,945,549
[45] Date of Patent: Jul. 31, 1990

[54] TRELLIS CODED MODULATION FOR TRANSMISSION OVER FADING MOBILE SATELLITE CHANNEL

[75] Inventors: Marvin K. Simon, La Canada; Dariush Divasalar, Pacific Palisades, both of Calif.

[73] Assignee: The United States of America as represented by the Administrator of the National Aeronautics and Space Administration, Washington, D.C.

[21] Appl. No.: 246,032

[22] Filed: Sep. 15, 1988

Related U.S. Application Data

[63] Continuation of Ser. No. 929,876, Nov. 13, 1986, abandoned.

[51] Int. Cl.⁵ .......................................... H04L 27/18
[52] U.S. Cl. ........................................ 375/53; 375/57; 371/43
[58] Field of Search ............... 375/34, 39, 44, 52, 375/53, 67, 83, 86, 97, 57, 58; 371/43, 44, 45; 332/103; 329/304, 310

[56] References Cited

U.S. PATENT DOCUMENTS

| | | | |
|---|---|---|---|
| 3,789,360 | 1/1974 | Clark, Jr. et al. | 371/43 |
| 3,988,539 | 10/1976 | Motley et al. | 375/53 |
| 4,077,021 | 2/1978 | Csajka et al. | 375/67 |
| 4,087,677 | 5/1978 | Dunn et al. | 325/30 |
| 4,240,156 | 12/1980 | Doland | 371/43 |
| 4,283,788 | 8/1981 | Tamburelli | 375/14 |
| 4,370,749 | 1/1983 | Levy et al. | 375/99 |
| 4,484,338 | 11/1984 | Clark et al. | 375/94 |
| 4,527,279 | 7/1985 | Yasuda et al. | 375/114 |
| 4,536,878 | 8/1985 | Rattlingourd et al. | 371/43 |
| 4,545,054 | 10/1985 | Davis | 371/43 |
| 4,567,591 | 1/1986 | Gray et al. | 371/43 |
| 4,578,800 | 3/1986 | Yasuda et al. | 375/106 |
| 4,583,078 | 4/1986 | Shenoy et al. | 340/347 DD |
| 4,583,236 | 4/1986 | Kromer et al. | 375/17 |
| 4,586,182 | 4/1986 | Gallager | 371/30 |
| 4,606,027 | 8/1986 | Otani | 371/43 |
| 4,641,327 | 2/1987 | Wei | 371/43 |
| 4,660,214 | 4/1987 | Pahlavan et al. | 371/43 |
| 4,675,880 | 6/1987 | Davarian | 375/54 |
| 4,677,625 | 6/1987 | Betts et al. | 375/39 |

OTHER PUBLICATIONS

Gottfried Ungerboeck, Channel Coding with Multilevel/Phase Signals, IEEE Transactions on Information Theory, vol. IT-28, Jan. 1982, pp. 55-67.

Forney, Jr. et al., Efficient Modulation for Band-Limited Channels, IEEE Journal on Selected Areas in Communications, vol., Sac-2, Sep. 1984, pp. 632-647.

Primary Examiner—Benedict V. Safourek
Attorney, Agent, or Firm—Thomas H. Jones; John R. Manning; Charles E. B. Glenn

[57] ABSTRACT

The combination of trellis coding and MPSK signaling with asymmetry (nonuniform spacing) to the signal set is disclosed with regard to its suitability for a fading mobile satellite communication channel. For MPSK signaling, introducing nonuniformity in the phase spacing between signal points provides an improvement in performance over that achievable with trellis codes symmetric MPSK signaling, all this without increasing the average or peak power, or changing the bandwidth constraints imposed on the system. Block interleaving may be used to reduce error and pilot tone(s) may be used for improving the error correction performance of the trellis decoder in the presence of channel fading.

6 Claims, 9 Drawing Sheets

A SYMMETRIC 8PSK  B ASYMMETRIC 8PSK

FIG. 13 SUMMARY OF RESULTS
DECODER BUFFER SIZE = 32 SYMBOLS

| TYPE OF MODULATION | FADING K (dB) | DOPPLER $f_d$ (Hz) | BLOCK INTERLEAVE 128 SYMBOLS | CHANNEL STATE INFORMATION (CSI) | REQUIRED BIT SNR (dB) AT BER = $10^{-3}$ |
|---|---|---|---|---|---|
| QPSK | 10 | 100 | NO | NO | 9.6 |
| TCM | 10 | 100 | NO | NO | 8.0 |
| TCM | 10 | 100 | YES | NO | 6.6 |
| TCM | 10 | 100 | YES | YES | 6.0 |
| TCM | 10 | 20 | YES | YES | 7.0 |
| QPSK | 7 | 100 | NO | NO | 12.0 |
| TCM | 7 | 100 | YES | YES | 7.0 |
| TCM | 7 | 20 | NO | YES | 8.5 |
| QPSK | 5 | 100 | NO | NO | 15.0 |
| TCM | 5 | 100 | YES | YES | 7.8 |
| TCM | 5 | 20 | YES | YES | 10.5 |

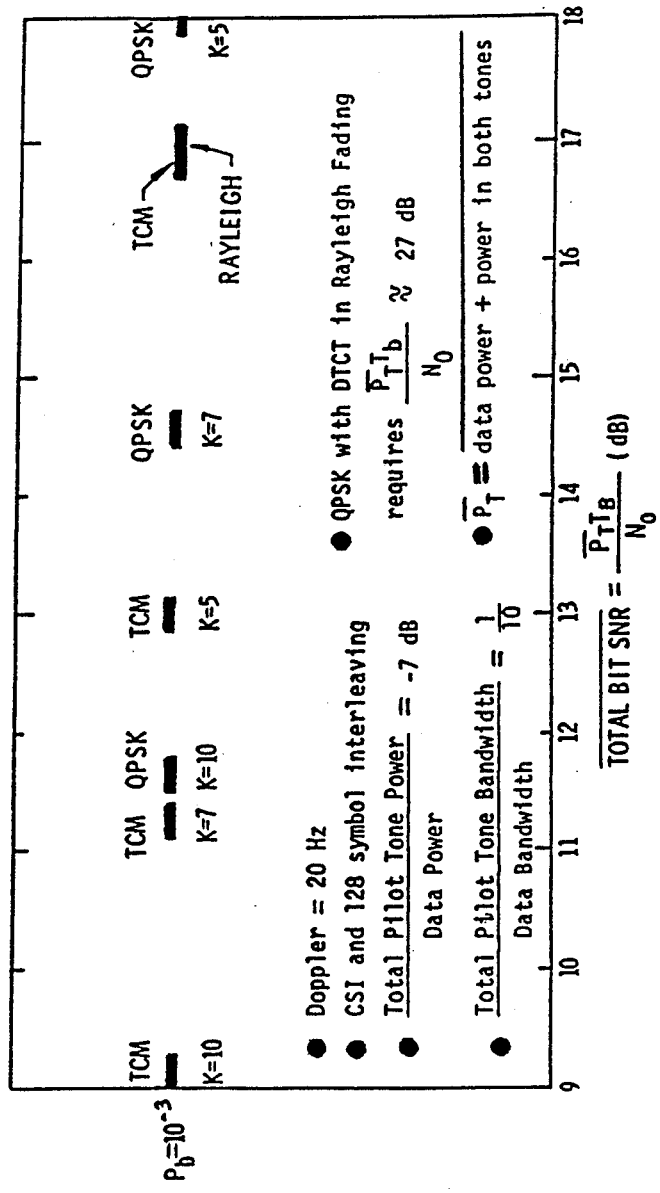

TRELLIS CODED MODULATION FOR TRANSMISSION OVER FADING MOBILE SATELLITE CHANNEL

ORIGIN OF INVENTION

The invention described herein was made in the performance of work under a NASA contract, and is subject to the provisions of Public Law 96-517 (35 USC 202) in which the Contractor has elected not to retain title.

This application is a continuation of application Ser. No. 929,876, filed 11/13/86, now abandoned.

BACKGROUND OF THE INVENTION

This invention relates to transmission of trellis coded modulation (TCM) of digital voice and data, and more particularly to TCM in combination with multiple phase-shift-keyed (MPSK) signaling, and with asymmetry (nonuniformity) in the phase shift of the MPSK signal set for reliable high quality communications in the presence of fading conditions, particularly when limitations of power and bandwidth are imposed.

There is a growing need for reliable transmission of high quality voice and digital data in satellite-based land mobile communication systems. These systems, which will be part of an emerging all-digital network, are both power and bandwidth limited. To satisfy the bandwidth limitation, one can employ bandwidth efficient modulation techniques such as those that have been developed over the recent past for terrestrial microwave communications systems. Examples of these are multiple phase-shift keyed (MPSK) signaling, quadrature amplitude modulation (QAM) and the various forms of continuous phase frequency modulation (CPM). When power is limited, forward error correction (FEC) coding is ordinarily used.

When limitation of power and bandwidth are both imposed simultaneously, as in the mobile satellite application, it is most often not possible to achieve the desired data rate of 4.8 or 9.6 kilobits per second (kbps) with either technique acting alone. Instead, what is required is the integration of bandwidth efficient modulation scheme with some form of FEC coding to exploit the best possible attributes of both.

In the past, coding and modulation were treated as separate operations with regard to overall system design. In particular, most earlier coded digital communication systems independently optimized: (a) conventional (block or convolutional) coding with maximized minimum Hamming distance, and (b) conventional modulation with maximally separated signals.

About a decade ago, using random coding bound arguments, it was shown that considerable performance improvement could be obtained by treating coding and modulation as a single entity. (J. L. Massey, "Coding and Modulation in Digital Communications," Proc. 1974 Int. Zurich Seminar on Digital Commun., Zurich, Switzerland, March 1974, pp. E2(1)–(4).) Many years later, this concept was formalized into a rigorous theory which showed that optimally designed rate $n/(n+1)$ trellis codes suitably mapped (to maximize Euclidean distance) into conventional $2^{n+1}$-point signal sets can provide significant coding gain without bandwidth expansion when compared with uncoded conventional $2^n$-point signal sets. (G. Ungerboeck, "Channel Coding with Multilevel/Phase Signals," IEEE Trans. on Inform. Theory, Vol. IT-28, No. 1, January 1982, pp. 55–67.) It is this work that has laid the foundation for the design and development of all power and bandwidth efficient digital modems found in practice today and those that are to come in the future.

The most common application of such trellis coded modulation (TCM) techniques is in the new generation of modems being developed for the telephone channel. Indeed, the present state-of-the-art is a rate 6/7, 8-state trellis coded 128-point QAM which is capable of transmitting 14.4 kbps over good quality (D1-conditioned or better) leased telephone lines. (J. Payton and S. Qureshi, "Trellis Encoding: What it is and How it Affects Data Transmission," Data Communications, May 1985, pp. 143–152.) Thus if it is practical to send 14.4 kbps over the telephone channel, transmitting 4.8 or 9.6 kbps information for a 5 kHz satellite channel (typical of present considerations) might appear to be simple.

Several reasons make this supposition untrue most of which relate to the additional sources of degradation present on the mobile satellite channel but absent on the telephone channel. First, Doppler frequency shifts due to mobile vehicle motion can be a serious source of performance degradation if not compensated. Second, the fact that the 5 kHz mobile channel is actually a slot in a frequency-division multiple access (FDMA) system, brings on the problem of interference due to energy spillover from adjacent channels. Third, the satellite channel is inherently a nonlinear one primarily due to the holding and positioning aid (HPA) in the transmitter. Thus, one must either employ constant envelope modulations and operate at full power or, if using nonconstant envelope, but bandwidth efficient modulations such as QAM, then the HPA operating point must be backed off in power to produce an approximately linear channel.

The most serious source of impairment that does not exist on the telephone channel is the combination of multipath fading and shadowing, i.e., for reliable performance, the system must combat short fades and recover quickly from long fades. Fading, which for mobile satellite channels can be assumed to be modelled by a Rician distribution, not only introduces an error floor into the system but also makes the problem of carrier recovery more difficult. Depending on the ratio of direct and specular (coherent component) to diffuse (noncoherent component) signal power, one might even be required to employ differentially coherent or noncoherent detection techniques, thus sacrificing the power saving associated with coherent detection. Finally, even if the above sources of degradation were absent, the power limitation imposed by the mobile satellite channel would preclude transmission at the high data rates achievable on the telephone channel. Also, whatever technique is decided upon must be able to be implemented and installed in the vehicle with a minimum of cost and complexity, perhaps two orders of magnitude less than that associated with a telephone channel modem.

SUMMARY OF THE INVENTION

In accordance with the present invention, the combination of trellis coding and MPSK signaling with the addition of asymmetry (nonuniform phase spacing) to the signal set provides a viable modulation and coding scheme for a fading mobile-satellite channel. For MPSK signaling, introducing nonuniformity into the phase spacing between signal points provides an improvement in performance over that achievable with trellis coding and symmetric MPSK signaling without increasing the average or peak power, or changing the bandwidth constraints imposed on the system.

Whereas trellis coded modulation transmitted over an additive white Gaussian noise (AWGN) channel has been previously considered, the object of this invention is use of trellis coded MPSK in the fading environment of a mobile-satellite communication system. The object is achieved by using a combination of trellis coding and asymmetric MPSK signaling. The effect of the fading on the phase of the received signal is fully compensated, either by tracking it with some form of phase-locked loop, or preferably with pilot tone calibration techniques. Thus, the combination of trellis coding and asymmetric MPSK will correct for degradation due to the effect of fading on the amplitude of the received signal. The technique of interleaving and deinterleaving is employed to further combat the loss of data bits due to fading.

BRIEF DESCRIPTION OF THE DRAWINGS

FIG. 13 is a table which summarizes the results of FIGS. 11 and 12.

FIG. 14 illustrates in a chart, performance of trellis coded modulation vs. QPSK modulation with dual tone calibration technique (TCT).

DESCRIPTION OF PREFERRED EMBODIMENTS

Figure 1:
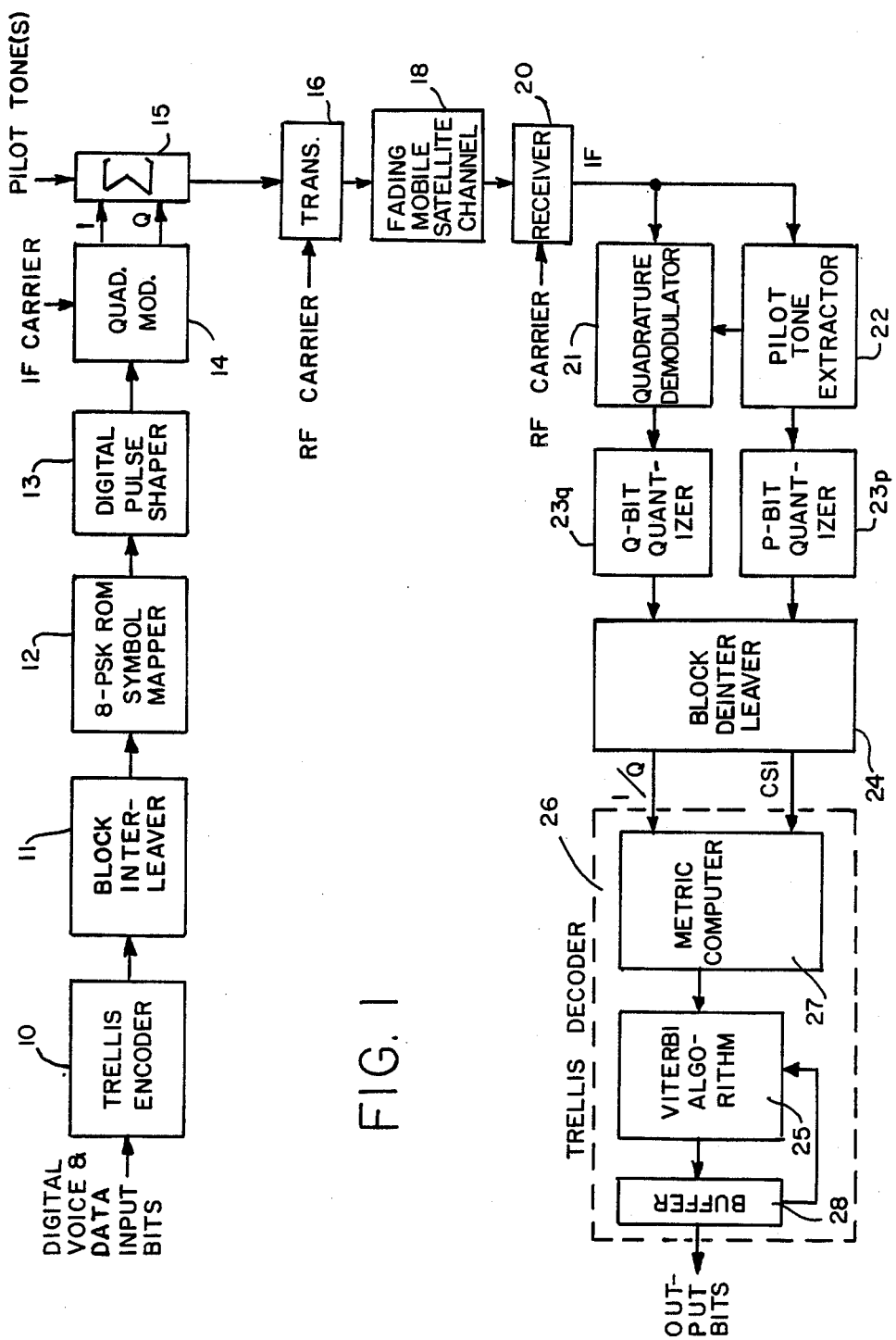
FIG. 1 is a functional block diagram of a trellis encoded transmission system embodying the present invention.

Referring now to FIG. 1 which shows a block diagram of the present invention, input bits representing data or digitally encoded voice are passed through a rate n/(n+1) trellis encoder 10 which is normally implemented with a combination of n shift registers (the memory of the encoding operation) and appropriate mod-2 adders (XOR gates). The encoder output symbols are then block interleaved in an interleaver 11 to break up burst errors caused by amplitude fades of duration greater than one symbol time. While in practice the depth of interleaving is finite and chosen in relation to the maximum fade duration anticipated, for the purpose of theoretical analysis, the usual assumption is made herein of infinite interleaving depth. This assumption provides a memoryless channel for which well-known bit error probability bounding techniques can be applied. However, the simulation results do reflect a finite interleaving depth. Thus, simulation results will be slightly pessimistic when compared with those derived from theory. The primary purpose of the theoretical analysis is to indicate through an example the trend of the performance behavior as a function of the various system parameters leaving the actual numerical performance to be predicted by the simulations.

Groups of n+1 interleaved symbols are mapped with a read only memory (ROM) mapper 12 into the MPSK asymmetric signal set according to the set partitioning method. (G. Ungerboeck, "Channel Coding with Multilevel/Phase Signals," IEEE Trans. on Inform. Theory, Vol. IT-28, No. 1, January 1982, pp. 55-67.) The in-phase and quadrature components of the mapped signal point are pulse shaped by a digital pulse shaper 13 to limit intersymbol interference (ISI) and modulated onto quadrature carriers by a quadrature modulator 14 for transmission over the channel. If pilot tone calibration techniques are used to recover the faded carrier at the receiver, then the pilot tone (or tones) must be added to the data-modulated IF signal as indicated by an adder 15 before transmission on a RF carrier by a transmitter 16 over a fading channel 18.

At the receiver 20, the RF carrier is received and the IF signal is recovered. The faded noise-corrupted in-phase and quadrature signal components of the IF signal are: demodulated by a quadrature demodulator 21 aided by the pilot tone(s) from an extractor 22; q-bit quantized by a quantizer $23_q$ for soft decision decoding; and then block deinterleaved by a deinterleaver 24. The metric chosen for the Viterbi algorithm 25 in a trellis decoder 26, which uses a metric computer 27, depends upon whether or not channel state information (CSI) is provided. (J. Hagenauer, "Viterbi Decoding of Convolutional Codes for Fading-and Burst-Channels," 1980 Int. Zurich Seminar on Digital Commun., Zurich, Switzerland, March 1980, pp. G2.1-G2.7.)

As indicated in FIG. 1, a measure of CSI can be obtained from the power in the recovered pilot tone(s). Furthermore, the number of bits of quantization, p, in a P-bit quantizer $23_p$ for this operation can be much smaller than the number of bits of quantization q in the Q-bit quantizer $23_q$ since the accuracy of the CSI has only a secondary effect when compared with that of the soft decisions themselves. Finally, the tentative soft decisions from the Viterbi algorithm 25 are stored in a buffer 28 whose size is a design parameter. In particular, for the case of voice transmission, the total coding/decoding delay must be kept below about 60 ms so as not to be objectionable to the listener. Thus, for a given input bit rate, the decoder buffer and interleaving frame sizes must be limited so as to produce at most a 60 ms delay. For simplicity, an infinite buffer is assumed in the analysis, whereas the simulations reflect a finite buffer in accordance with the delay limitation.

Figure 2:
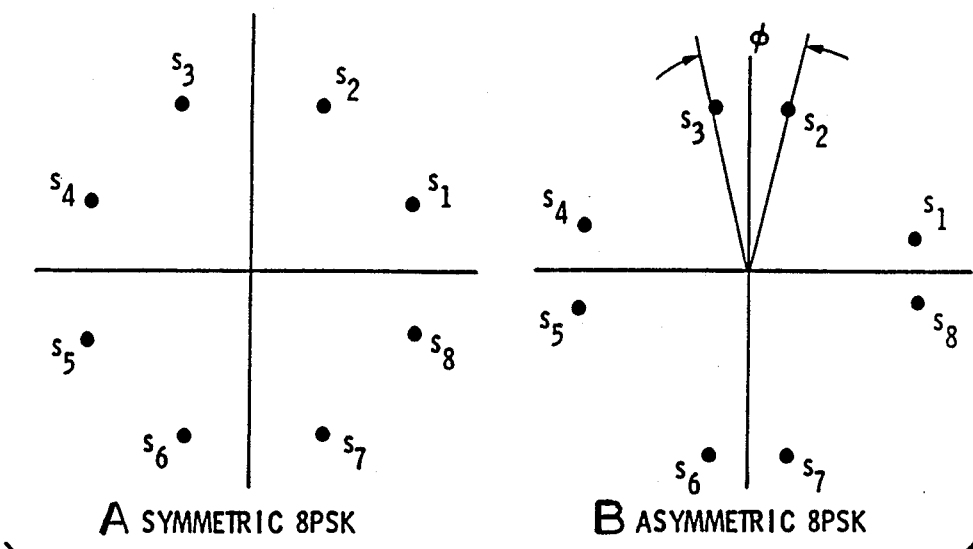
FIG. 2 is a diagram illustrating in graph A symmetric 8-PSK and in graph B asymmetric (nonuniform) phase spacing of signal points in 8-PSK modulation.

In order to better understand the use of the term "asymmetric MPSK" as applied to the present invention, reference is made to FIG. 2 which shows in graph A a symmetric 8-PSK signal set uniformly spaced in phase. Graph B then shows an asymmetric 8-PSK signal set nonuniformly spaced in phase. It is this spacing that is referred to as asymmetric 8-PSK, even though there is symmetry but not uniform spacing in phase.

Derivation Of The Pairwise Error Probability Bound

Figure 1A:
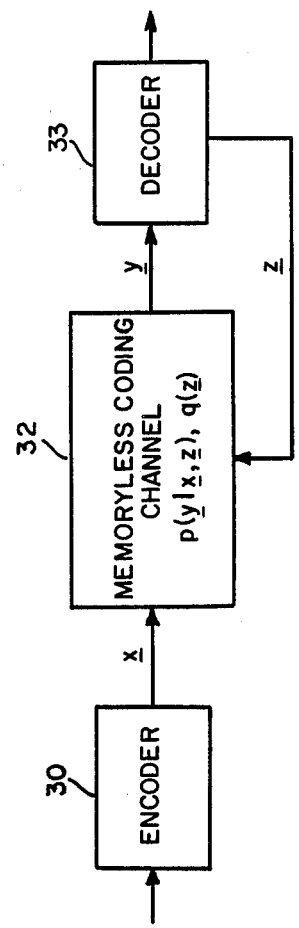
FIG. 1a illustrates a basic analysis model for the system of FIG. 1.

The basic analysis model for the system of FIG. 1 is illustrated in FIG. 1a. The box 30 labelled encoder is actually the combination of the trellis encoder 10 (with binary input and output) and the function of the mapper 12. This combination can be described as a trellis encoder with binary input and M-ary output. (R. Calderbank and J. E. Mazo, "A New Description of Trellis Codes," IEEE Transactions on Information Theory, Vol. IT-30, No. 6, November 1984, pp. 784–791.) In our notation, $M=2^{n+1}$. Also, if the input bit rate is denoted by $R_b$, then the symbol rate input to the channel is $R_b/n$. We denote a coded symbol sequence of length N by $$\underline{X} = (x_1, x_2, \ldots, x_n) \tag{1}$$

where the kth element of $\underline{x}$, namely $x_k$, represent the transmitted MPSK symbol at time k and is a nonlinear function of the state of the encoder $s_k$ and the n information bits, $\underline{u}_k$, at its input, viz., $$x_k = f(s_k, \underline{u}_k) \tag{2}$$

The next state of the encoder $s_{k+1}$ at the time $k+1$ is a nonlinear function of the present state $s_k$ and the n-bit input $\underline{u}_k$ which is mathematically described by $$s_{k+1} = g(s_k, \underline{u}_k) \tag{3}$$

Corresponding to $\underline{x}$, the channel outputs the sequence $$\underline{y} = (y_1, y_2, \ldots, y_N) \tag{4}$$

where the kth element $y_k$, representing the output at time k, is given by $$y_k = \rho_k x_k + n_k \tag{5}$$

In equation 5, $\rho_k$ is a normalized (unit mean-squared value) random amplitude whose probability statistics depend on the fading channel model (to be discussed below) and $n_k$ is a sample of a zero-mean Gaussian noise process with variance $\sigma^2$. The factor $\rho_k$ is the fading amplitude for use as side information, $z_n$, in the trellis decoder under fading conditions. If this side information is available, then the corresponding side information sequence $\underline{z}$ will be denoted by $$\underline{z} = (z_1, z_2, \ldots, z_n). \tag{6}$$

As stated hereinbefore, we shall assume adequate (theoretically infinite) interleaving and deinterleaving so that the coding channel is memoryless as indicated by box 32 in FIG. 1a. Under this assumption, the $\rho_k$'s are independent random variables (r.v.'s) and hence the channel probabilities satisfy $$p_N(\underline{y}|\underline{x}, \underline{z}) = \prod_{N=1}^{N} p(y_n|x_n, z_n) \tag{7}$$

and $$q_N(\underline{z}) = \prod_{n=1}^{N} q(z_n) \tag{8}$$

For any coded communication system, the decoder 33 uses a metric of the form $m(\underline{y},\underline{x};\underline{z})$ if side information is available and $m(\underline{y},\underline{x})$ if it is not. Whatever metric is selected, it is desirable from the standpoint of simplifying the decoding process that it have an additive property, namely that the total metric for a sequence of symbols is the sum of the metrics for each channel input and output pair. In terms of equations 1, 4 and 6, this takes the form $$m(\underline{y}, \underline{x}; \underline{z}) = \sum_{n=1}^{N} m(y_n, x_n; z_n) \tag{9}$$

The maximum-likelihood metric $$m(\underline{y},\underline{x}; \underline{z}) = \ln p_N(\underline{y}|\underline{x},\underline{z}) \tag{10a}$$

when side information is available or $$m(\underline{y},\underline{x}) = \ln p_N(\underline{y}|\underline{x}) \tag{10b}$$

when no side information is available satisfies the requirement in equation 9. This is easily seen by substituting equation 7 in equation 10 and recalling that the logarithm of a product equals the sum of the logarithms. Thus, we shall use this metric in what follows. Also for simplicity, we shall use only the notation of equation 10a, keeping in mind that the case where no side information is available is a special case where the metric $m(\underline{y},\underline{x})$ does not depend on $\underline{z}$.

To find an upper bound on the average bit error probability performance of the Viterbi decoder, we must first find the pair-wise error probability $P(\underline{x} \to \hat{\underline{x}})$ which represents the probability of choosing the coded sequence $\hat{\underline{x}} = (\hat{x}_1, \hat{x}_2, \ldots, \hat{x}_N)$ instead of $\underline{x} = (x_1, x_2, \ldots, x_N)$. Since the decoder incorrectly decides $\underline{x}$ is the transmitted sequence when $$m(\underline{y},\hat{\underline{x}};\underline{z}) \geq m(\underline{y},\underline{x};\underline{z}) \tag{11a}$$

or, equivalently, $$\sum_{n=1}^{N} m(y_n, \hat{x}_n; z_n) \geq \sum_{n=1}^{N} m(y_n, x_n; z_n), \tag{11b}$$

then, the pair-wise probability $P(\underline{x} \to \hat{\underline{x}})$ is given by $$P(\underline{x} \to \hat{\underline{x}}) = Pr\left\{ \sum_{n=1}^{N} m(y_n, \hat{x}_n; z_n) \geq \sum_{n=1}^{N} m(y_n, x_n; z_n) | \underline{x} \right\} \tag{12}$$

Applying the Chernoff bound, equation 12 becomes equation 10

$$P(\underline{x} \to \underline{\hat{x}}) \leq \pi_{n\epsilon\eta} E\{\exp(\lambda[m(y_n, \hat{x}_n; z_n) - m(y_n, x_n; z_n)])|\underline{x}\} \quad (13)$$

where "E" is the statistical expectation operation, $\lambda$ is the Chernoff parameter to be optimized, and $\eta$ is the set of all n such that $x_n \neq \hat{x}_n$. To simplify equation 13 further, we must specify whether or not side information is available.

a. Ideal Channel State Information (CSI)

The assumption of ideal channel state information is tantamount to assuming that the side information r.v. $z_n$ is equal to the fading amplitude $\rho_n$. Thus, since $n_n$ is Gaussian distributed and in general, $x_n$ and $y_n$ are complex quantities, then using equations 5 and 10a gives $$m(y_n, x_n; z_n) = -|y_n - \rho_n x_n|^2 \quad (14)$$

where for simplicity we shall ignore the $\frac{1}{2}\sigma^2$ factor since it would later be absorbed in the Chernoff bound parameter $\lambda$ anyway. Substituting equation 14 into equation 13, and conditioning on $\rho$, a fading correction factor obtained by monitoring the pilot signal amplitude, we get $$P(\underline{x} \to \underline{\hat{x}}|\underline{\rho}) \leq \pi_{n\epsilon\eta} \exp(-\lambda \rho_n^2 |x_n - \hat{x}_n|^2) E\{\exp[-2\lambda \rho_n Re\{n_n(x_n - \hat{x}_n)^*\}]\} \quad (15)$$

By representing the complex noise r.v. $n_n$ in terms of its real and imaginary parts where re$\{n_n\}$ and Im$\{n_n\}$ are uncorrelated, zero mean Gaussian r.v.'s each with variance $\sigma_N^2 = \sigma^2/2$, it can be shown that $$E\{\exp[-2\lambda \rho_n Re\{n_n(x_n - \hat{x}_n)^*\}]\} = \exp[2\lambda^2 \rho_n^2 \sigma_N^2 |x_n - \hat{x}_n|^2] \quad (16)$$

Substituting equation 16 and equation 15 gives after some simplification $$P(\underline{x} \to \underline{\hat{x}}|\underline{\rho}) \leq \pi_{n\epsilon\eta} \exp(-\lambda \rho_n^2 |x_n - \hat{x}_n|^2 (1 - 2\lambda \sigma_N^2)) \quad (17)$$

Since $\sigma_N^2$ is independent of n, optimizing equation 17 over the Chernoff bound parameter $\lambda$ yields $$\lambda_{opt} = \frac{1}{4\sigma_N^2} \quad (18)$$

which, when substituted in equation 17, produces the desired result, namely $$P(\underline{x} \to \underline{\hat{x}}|\underline{\rho}) \leq \pi_{n\epsilon\eta} D^{\rho_n^2 |x_n - \hat{x}_n|^2}; \quad D = \exp(-1/8\sigma_N^2) \quad (19)$$

Finally, equation 19 can be rewritten as $$P(\underline{x} \to \underline{\hat{x}}|\underline{\rho}) \leq D^{d^2(\underline{x},\underline{\hat{x}})} \quad (20)$$

where $$d^2(\underline{x}, \underline{\hat{x}}) \overset{\Delta}{=} \sum_{n\epsilon\eta} \rho_n^2 |x_n - \hat{x}_n|^2 \quad (21)$$

represents the square of the weighted Euclidean distance between the two symbol sequences $\underline{x}$ and $\underline{\hat{x}}$.

Finally, the pairwise error probability upperbound is obtained by averaging equation 20 over the probability density function (p.d.f.) of $\underline{\rho}$.

b. No Channel State Information (CSI)

When no channel state information is available, the metric of equation 10b becomes $$m(y_n, x_n) = -|y_n - x_n|^2 \quad (22)$$

Substituting equation 5 into equation 22, then, analogous to equation 15, we get $$P(\underline{x} \to \underline{\hat{x}}|\underline{\rho}) \leq \pi_{n\epsilon\eta} \exp[-\lambda|x_n - \hat{x}_n|^2 - 2\lambda(\rho_n - 1)Re\{x_n(x_n - \hat{x}_n)^*\}] \times E\{\exp[-2\lambda \rho_n Re\{n_n(x_n - \hat{x}_n)^*\}]\} \quad (23)$$

Again using equation 16, equation 23 simplifies to $$P(\underline{x} \to \underline{\hat{x}}|\underline{\rho}) \leq \pi_{n\epsilon\eta} \exp[-\lambda|x_n - \hat{x}_n|^2(1 - 2\lambda\sigma_N^2) - 2\lambda(\rho_n - 1)Re\{x_n(x_n - \hat{x}_n)^*\}] \quad (24)$$

For constant envelope signal sets such as MPSK where $|x|^2 = |\hat{x}|^2$, equation 24 can be further simplified by noting that $$|x - \hat{x}|^2 = 2Re\{x(x - \hat{x})^*\} \quad (25)$$

Thus substituting equation 25 into equation 24, and renormalizing the Chernoff parameter (i.e., replace $\lambda$ by $2\lambda \sigma_n^2$), we get the desired result analogous to equation 17, namely, $$P(\underline{x} \to \underline{\hat{x}}|\underline{\rho},\lambda) > D^{c^2(\underline{x},\underline{\hat{x}}|\underline{\rho},\lambda)} \quad (26)$$

where D is again given by equation 19 and $$c^2(\underline{x},\underline{\hat{x}}|\underline{\rho},\lambda) = \sum_{n\epsilon\eta} 4\lambda(\rho_n - \lambda)|x_n - \hat{x}_n|^2$$
$$= 4\lambda \sum_{n\epsilon\eta} \rho_n |x_n - \hat{x}_n|^2 - 4\lambda^2 d^2(\underline{x},\underline{\hat{x}}) \quad (27)$$

Note that unlike equation 17, equation 26 cannot be optimized over $\lambda$ to yield a constant value for this parameter. Thus, in this case, we must first average over the fading distribution.

Derivation of the Bit Error Probability Bound

To derive the upper bound on bit error probability from the pairwise error probability bound, we follow the transfer function approach taken in M. K. Simon and D. Divsalar, "Combined Trellis Coding with Asymmetric MPSK Modulation," JPL Publication 85-24 (MSAT-X Report No. 109), May 1, 1985. In particular, we first find the unconditioned pairwise error probability by averaging equation 20 or 26 over the p.d.f. of $\rho$. (This averaging will be denoted by an overbar.) When this is done, the pairwise error probability can be expressed in the form:

$$P(\underline{x} \to \hat{\underline{x}}) = \overline{D^\Delta} \quad (28)$$

where for the ideal channel state information case $$\Delta = \sum_{n \in \eta} \rho_n^2 |x_n - \hat{x}_n|^2 \quad (29a)$$

and for the no channel state information case $$\Delta = \sum_{n \in \eta} 4\lambda(\rho_n - \lambda)|x_n - \hat{x}_n|^2 \quad (29b)$$

For uniformity of notation, we shall drop the dependence of the pairwise error probability on $\lambda$ for the no channel state information case.

In dealing with upper bounds of this type, it is convenient to work with a pair-state transition diagram where the pair-state $S_k$ and pair-information symbol $U_k$ are defined as $$S_k \stackrel{\Delta}{=} (s_k, \hat{s}_k) \quad (30)$$

$$U_k \stackrel{\Delta}{=} (u_k, \hat{u}_k)$$

where $\hat{s}_k$ and $\hat{u}_k$ are the estimates of the state of the decoder and the information symbol, respectively. We are in a correct pair-state when $\hat{s}_k = s_k$ in an incorrect pair-state when $\hat{s}_k \neq s_k$. Substituting equation 2 into equation 29, we can write the latter as $$\Delta = \sum_{n \in \eta} \delta^2(S_n, U_n) \quad (31)$$

where $$\delta^2(S_n, U_n) = \rho_n^2 |f(s_n, u_n) - f(\hat{s}_n, \hat{u}_n)|^2 \quad (32a)$$

or $$\delta^2(S_n, U_n) = 4\lambda(\rho_n - \lambda)|f(s_n, u_n) - f(\hat{s}_n, \hat{u}_n)|^2 \quad (32b)$$

When no fading is present, equation 28 is given by $$P(\underline{x} \to \hat{\underline{x}}) = D^\Delta \quad (33)$$

where $\Delta$ is still of the form in equation 31 with, however, $$\delta^2(S_n, U_n) = |f(s_n, u_n) - f(\hat{s}_n, \hat{u}_n)|^2 \quad (34)$$

In terms of the above definitions, it can be shown by analogy with the results in M. K. Simon and D. Divsalar, "Combined Trellis Coding with Asymetric MPSK Modulation," cited above, that the average bit error probability $P_b$ is upper bounded by $$P \leq \frac{1}{n} \frac{d}{dI} \overline{T}(D, I)|_{I=1} \quad (35)$$

where $\overline{T}(D, I)$ is the transfer function of the pair-state transition diagram whose branch label gains are modified from those for the no fading case as follows. In the absence of fading each branch label gain has a factor $$D^{\delta^2(S_n, U_n)}$$

where $\delta^2(S_n, U_n)$ is given by equation 34. For the fading case, we simply replace $$D^{\delta^2(S_n, U_n)} \text{ by } \overline{D^{\delta^2(S_n, U_n)}}$$

where again the overbar denotes averaging over the p.d.f. of $\rho$ and $\delta^2(S_n, U_n)$ is given by equation 32a or 32a, as appropriate, depending on the availability of channel state information (CSI).

Finally for the case of no channel state information, we must minimize the upper bound of equation 35 over the Chernoff parameter to obtain the tightest upper bond. Recall that for the ideal channel state information case, we were able to perform this optimization at the pairwise error probability level.

Characterization of the Fading Channel

For mobile satellite communication, multipath fading produces a received signal with an amplitude which can be modelled by Rician statistics with parameter K representing the ratio of the power in the direct (line-of-sight) and specular component to that in the diffuse component. We assume that the phase distortion produced by the fading is fully compensated for either by tracking it with some form of phase-locked loop or with pilot tone calibration techniques. (J. McGeehan and A. Bateman, "Phase-lock Transparent Tone-in-Band (TTIB): A New Spectrum Configuration Particularly Suited to the Transmission of Data over SSB Mobile Radio Networks," IEEE Trans. on Commun., Vol. COM-32, pp. 81–87, January 1984). If shadowing is severe, then a Rayleigh statistical model becomes appropriate which can be looked upon as the limiting case of a Rician channel when K approaches zero. Of course, the case of no fading corresponds to a Rician channel with K approaching infinity.

Mathematically speaking, the above statements correspond to a p.d.f. for the fading r.v. given by $$p(\rho) = \begin{cases} 2\rho(1 + K)\exp[-K - \rho^2(1 + K)]I_0(2\rho\sqrt{K(1 + K)}) & ; \rho \geq 0 \\ 0; & \text{otherwise} \end{cases} \quad (36)$$

where $I_0(x)$ is the zero-order modified Bessel function of the first kind.

An Example

Figure 3:
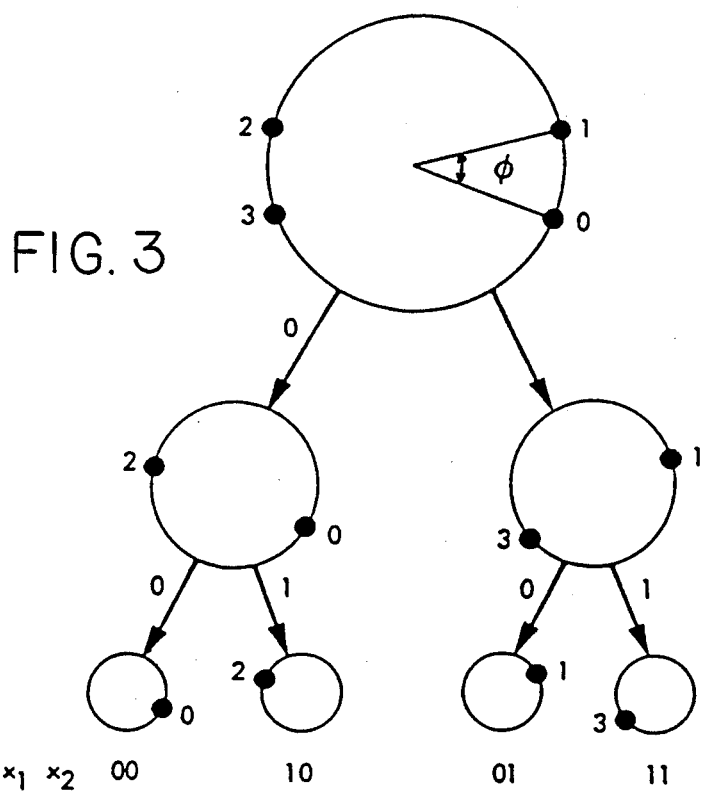
FIG. 3 is a diagram illustrating set partitioning of asymmetric 4-PSK modulation.
Figure 4:
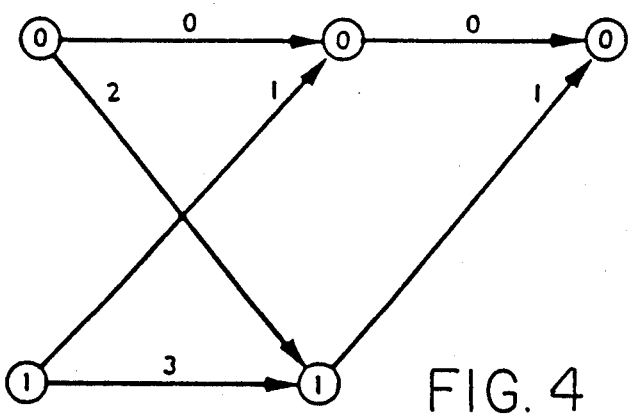
FIG. 4 is a diagram illustrating a trellis for MPSK signal assignment of 4-PSK modulation.

Consider the case of rate $\frac{1}{2}$ trellis coded asymmetric QPSK using a 2-state trellis. The appropriate set partitioning is illustrated in FIG. 3, the trellis diagram in FIG. 4, and the pair-state transition diagram in FIG. 5. The performance of this system in the absence of fading was treated by M. K. Simon and D. Divsalar in "Combined Trellis Coding with Asymmetric MPSK Modulation," cited above, with the following results:

$$T(D, I) = \quad (37a)$$

$$\frac{4ac}{1 - 2b}; a = \frac{I}{2} D^4; b = \frac{I}{2} D^{\frac{4}{1+\alpha}}; c = \frac{1}{2} D^{\frac{4\alpha}{1+\alpha}}$$

or

-continued $$T(D,I) = \frac{ID^{\frac{4(1+2\alpha)}{1+\alpha}}}{1 - ID^{\frac{4}{1+\alpha}}} \quad (37b)$$

where d as defined in equation 19 becomes $$D = \exp\left(-\frac{E_b}{4N_0}\right); \frac{E_b}{N_o} = \text{system bit energy-to-noise spectral density ratio} \quad (38)$$

and $\alpha$ is the ratio of powers between the I and Q channels which is related to the angle $\phi$ that defines the asymmetry (see FIG. 3) by $$\alpha = \tan^2 \frac{\phi}{2} \quad (39)$$

Substituting equation 37 into equation 35 gives $$P_b \leq \frac{D^{\frac{4(1+2\alpha)}{1+\alpha}}}{\left(1 - D^{\frac{4}{1+\alpha}}\right)^2} \quad (40)$$

Optimizing equation 40 over the assymetry produces $$\alpha = -\frac{4 \ln D}{\ln 3} - 1 = \frac{E_b/N_0}{\ln 3} - 1 \quad (41)$$

which when substituted into equation 40 gives the desired upper bound $$P_b \leq \frac{27}{4} \exp(-2E_b/N_0) \quad (42)$$

a. Ideal Channel State Information

Recalling equation 29a, we see that the transfer function $\overline{T}(D,I)$ of the pair-state transition diagram for the case of ideal channel state information is obtained by merely replacing $D^\beta$ by $$\overline{D^{\rho 2\delta}}$$

in the branch label gains of equation 37a where $\beta = 4$, $4/(1+\alpha)$, or $4\alpha/(1+\alpha)$ as appropriate. For the Rician p.d.f. of equation 36, $$\overline{D^{\rho 2\beta}} \text{ evaluates to} \quad (43a)$$

$$\overline{D^{\rho 2\beta}} = \left(\frac{1+K}{1+K+\beta\gamma}\right) D^{\frac{\beta K}{1+K+\beta\gamma}}; \gamma = \frac{E_b}{4N_0}$$

which for the Rayleigh special case (K=O) becomes $$\overline{D^{\rho 2\beta}} = \frac{1}{1+\beta\gamma} \quad (43b)$$

Note that $E_b$ represents the total average received power (direct plus specular plus diffuse) in the data bandwidth. In the general case of an n/(n+1) code rate, $E_b$ in the definition of $\lambda$ would be replaced by $nE_b$.

Evaluating T(D,I) of equation 37a using equation 43 and performing the differentiation required in equation 35 gives the upper bound on $P_b$ as $$P_b \leq \frac{\xi_1 \xi_3 D^{\zeta_1 + \zeta_3}}{(1 - \xi_2 D^{\zeta_2})^2} \quad (44)$$

where $$\zeta_i = \frac{\beta_i K}{1 + K + \beta_i \gamma}; \xi_i = \frac{1+K}{1+K+\beta_i \gamma}; \quad (45)$$

$$i = 1, 2, 3 \quad \beta_1 = 4; \beta_2 = \frac{4}{1+\alpha}; \beta_3 = \frac{4\alpha}{1+\alpha}$$

To obtain the best performance in the presence of fading, one should optimize equation 44 over the asymmetry parameter $\alpha$. Before doing this, however, we shall first examine the behavior of equation 44 for the symmetric case, i.e., $\alpha = 1$, and the optimum asymmetry in the absence of fading as given by equation 41.

Substituting $\alpha = 1$ in equation 45, the parameters $\xi_i \zeta_i$ simplify to $$\zeta_1 = \frac{4K}{1+K+4\gamma}; \xi_1 = \frac{1+K}{1+K+4\gamma} \quad (46)$$

$$\zeta_2 = \zeta_3 = \frac{2K}{1+K+2\gamma}; \xi_2 = \frac{1+K}{1+K+2\gamma}$$

Figure 6:
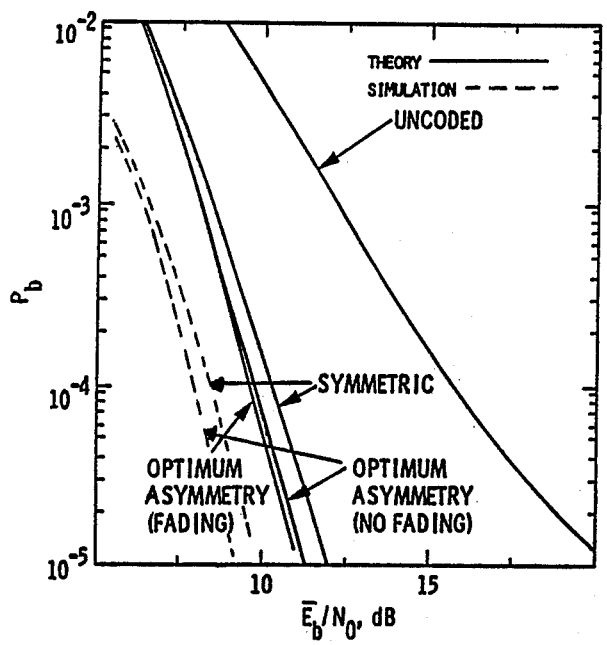
FIG. 6 is a graph of bit error probability performance vs. $\bar{E}_b/N_o$ for rate $\frac{1}{2}$ trellis coded QPSK in the presence of Rician fading; 2 states, K=10; ideal channel state information.

The curve labelled "symmetric" on FIG. 6 is a plot of the upper bound of equation 44 combined with equation 46 as a function of the average bit energy-to-noise ratio $E_b/N_O$ with a Rician parameter K=10 (typical of the mobile satellite channel).

When the value of $\alpha$ in equation 41 is substituted in equation 45, then after some simplification, equations 44 and 45 can be written as $$P_b \leq \frac{\xi_1' \xi_3' \exp[-(\zeta_1' + \zeta_2')]}{(1 - \xi_2' \exp(-\zeta_2'))^2} \quad (47)$$

and $$\zeta_i' = \frac{B_i' K}{1+K+\beta_i'}; \xi_i' = \frac{1+K}{1+K+\beta_i'}; \quad (48)$$

$$i = 1, 2, 3$$

$$\beta_1' = \frac{E_b}{N_0}; \beta_2' = \ln 3; \beta_3' = \frac{E_b}{N_0} - \ln 3$$

The behavior of equation 47 combined with equation 48 is also illustrated in FIG. 6 by the curve labelled "optimum asymmetry (no fading)."

For the Rayleigh case, the above results simplify even further. In particular, for the symmetric signal QPSK constellation, we get $$P_b \leq \left(\frac{1 + E_b/2N_0}{E_b/2N_0}\right)^2 \left(\frac{1}{1 + E_b/N_0}\right)\left(\frac{1}{1 + E_b/2N_0}\right) \quad (49)$$

whereas for the optimum asymmetry in the absence of fading, $$P_b \leq \left(\frac{1 + \ln 3}{\ln 3}\right)\left(\frac{1}{1 + E_b/N_0}\right)\left(\frac{1}{1 + E_b/N_0 - \ln 3}\right) \quad (50)$$

Figure 7:
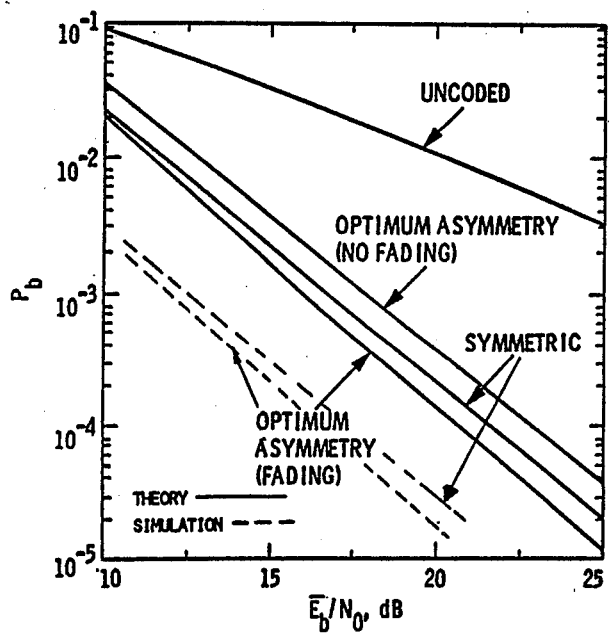
FIG. 7 is a graph of bit error probability performance vs. $\bar{E}_b/N_o$ for rate $\frac{1}{2}$ trellis coded QPSK in the presence of Rayleigh fading; 2 states; ideal channel state information.

These results are illustrated in FIG. 7. Note that here the curve labelled "optimum asymmetry (no fading)" gives worse performance than that of the symmetric case. Thus, at least here, we clearly see the need for performing the asymmetry optimization in the presence of the fading.

Figure 8:
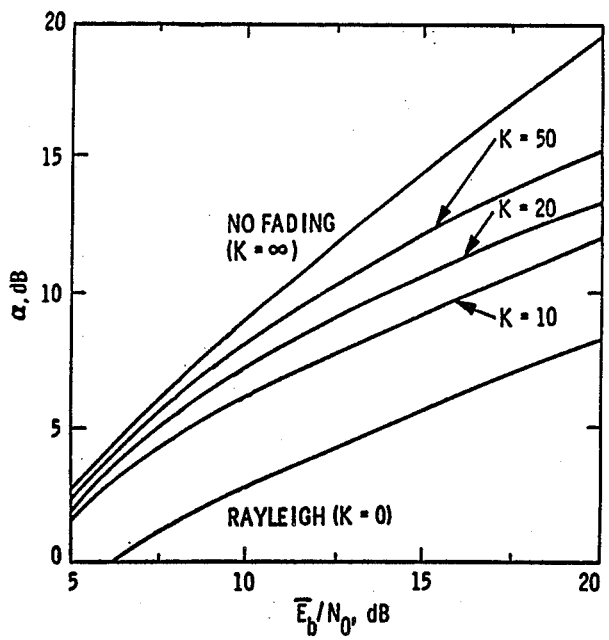
FIG. 8 is a graph of optimum asymmetry parameter vs. $\bar{E}_b/N_o$ for rate $\frac{1}{2}$ trellis coded QPSK in the presence of Rician fading.

To determine the optimum value of $\alpha$ for the Rician case, we need to differentiate equation 44 with respect to $\alpha$ and equate the result to zero. This leads to a transcendental equation which must be solved numerically. Rather than doing that, it is more expedient to directly minimize equation 44 with respect to $\alpha$ using numerical techniques. When this is done, we obtain the optimum bit error probability bound labelled "optimum asymmetry (fading)" in FIG. 6. For $K=10$, this curve lies quite close to the "optimum asymmetry (no fading)" curve. However, as we can already deduce form FIG. 7, this statement is not true for small values of K, in particular the Rayleigh channel with $K=0$. To exhibit the sensitivity of the optimum asymmetry condition to K, FIG. 8 illustrates the optimum value of $\alpha$ as a function of $\bar{E}_b/N_0$ with K as a parameter.

For the Rayleigh case, we can indeed determine the optimum asymmetry condition in closed form. In particular, differentiating equation 44 with $K=0$ in equation 45 and equating the result to zero has the solution $$\alpha = \frac{-4 + \bar{E}_b/N_0 (\sqrt{17 + 8\bar{E}_b/N_0} - 1)}{4(1 + \bar{E}_b/N_0)} \quad (51)$$

which when substituted back in equation 44 gives $$P_b \leq \frac{(3 + \sqrt{17 + 8\bar{E}_b/N_0}) \left[ 4(\bar{E}_b/N_0)^2 + (\bar{E}_b/N_0)^2(7 + \sqrt{17 + 8\bar{E}_b/N_0}) \right]^2}{16(\sqrt{17 + 8\bar{E}_b/N_0} - 1)(\bar{E}_b/N_0)^2(1 + \bar{E}_b/N_0)^4} \quad (52)$$

This result is illustrated by the curve labelled "optimum asymmetry (fading)" in FIG. 7 and is clearly superior to that corresponding to the symmetric signal constellation.

Finally, for purpose of comparison, the corresponding upper bound on the performance of uncoded BPSK (same bandwidth as rate $\frac{1}{2}$ trellis coded QPSK) in the presence of Rician and Rayleigh fading is also illustrated in FIGS. 6 and 7. The analytical results for these curves are well known and are given by $$P_b \leq \frac{1+K}{1+K+\bar{E}_b/N_0} \exp\left(-\frac{K\bar{E}_b/N_0}{1+K+\bar{E}_b/N_0}\right) \quad (53)$$

for the Rician channel and $$P_b \leq \frac{1}{1 + \bar{E}_b/N_0} \quad (54)$$

for the Rayleigh channel.

Depending on the shape of the bit error probability vs $\bar{E}_b/N_0$ curve, one can often deduce some important practical conclusions by examining the asymptotic behavior of the curve. Since for the Rayleigh case (FIG. 7), the error probability performance curves are essentially linear over a wide range of practical SNR's, one can approximately apply the asymptotic (large $\bar{E}_b/N_0$) result over this domain. In particular, for large $\bar{E}_b/N_0$, equations 49, 50, 52 and 54 respectively, become $$P_b \lesssim \frac{1}{(\sqrt{2\bar{E}_b/N_0})^2} \text{ (symmetric)} \quad (49')$$

$$P_b \lesssim \quad (50')$$

$$\frac{1}{\left[\left(\frac{\ln 3}{1 + \ln 3}\right)\frac{\bar{E}_b}{N_0}\right]^2} \text{ (optimum asymmetry - no fading)}$$

$$P_b \lesssim \frac{1}{(\bar{E}_b/N_0)^2} \text{ (optimum asymmetry - fading)} \quad (52')$$

and $$P_b \lesssim \frac{1}{\bar{E}_b/N_0} \text{ (uncoded)} \quad (54')$$

Thus, for example, comparing equation 49' with equation 54', we see that the effect of coding is to change the rate of descent of the error probability vs. $\bar{E}_b/N_0$ performance form an inverse linear to an inverse square law behavior. If the QPSK constellation is now designed according to the optimum asymmetry for no fading, then the performance is worse than that of the symmetric constellation by a factor of $(1+\ln 3)/\sqrt{2} \ln 3$ or 1.3 dB. On the other hand, if the constellation is designed with the optimum asymmetry determined in the presence of asymmetry, then, relative to the symmetric design, the performance is improved by a factor of square root of 2 or 1.5 dB. From FIG. 7, we see that these asymptotic results are almost achieved at an error rate of $10^{-5}$.

b. No Channel State Information

Recalling Equation 29b, we see that the transfer function T(D,I) of the pair-state transition diagram for the case of no channel state information is obtained by replacing $D^\beta$ this time by in the branch label gains of equation 37a where again $\beta=4$, $4/(1+\alpha)$, or $4\alpha/(1+\alpha)$ as appropriate. Unfortunately, for the Rician distribution, the factor cannot be evaluated in closed form. It can, however, be expressed as a single integral with finite limits as follows:

$$D^{4\lambda\beta\rho} = e^{-K}\left[1 - \frac{1}{\sqrt{\pi}}\int_0^\pi \eta(\theta)\exp[\eta^2(\theta)]erfc\eta(\theta)d\theta\right] \quad (55)$$

$$\eta(\theta) = \frac{\lambda\beta(\bar{E}_b/2N_0)}{\sqrt{1+K}} - \sqrt{K}\cos\theta$$

This integral is easily evaluated using Gauss-Chebyshev techniques, i.e., $$\int_0^\pi \eta(\theta)\exp[\eta^2(\theta)]erfc\eta(\theta)d\theta \approx \quad (56)$$

$$\frac{\pi}{N}\sum_{k=1}^N \eta(\theta_k)\exp[\eta^2(\theta_k)]erfc\eta(\theta_k)$$

where $\theta_k \triangleq (2k-1)\pi/2N$.

For the Rayleigh case, we can obtain a closed form result for this factor since, for $K=0$, $n(\theta)$ becomes independent of $\theta$. Thus $$\overline{D^{4\lambda\beta\rho}} = 1 - \sqrt{\pi}\,\lambda\beta\left(\frac{\overline{E_b}}{2N_0}\right)\exp\left[\left(\lambda\beta\frac{\overline{E_b}}{2N_0}\right)^2\right]\mathrm{erfc}\left(\lambda\beta\frac{\overline{E_b}}{2N_0}\right) \quad (57)$$

Evaluating $T(D,I)$ of equation 37a using equation 55 and performing the differentiation required in equation 35 gives the upper bound $$P_b \leq \min_{\lambda \geq 0}\min_\alpha \frac{\xi_1\xi_3 D^{-16\lambda^2(1+2\alpha)/(1+\alpha)}}{(1 - \xi_2 D^{-16\lambda^2/(1+\alpha)})^2} \quad (58)$$

where $$\xi_i = e^{-K}\left[1 - \frac{1}{\sqrt{\pi}}\int_0^\pi \eta_i(\theta)\exp(\eta_i^2(\theta))\mathrm{erfc}\,\eta_i(\theta)d\theta\right] \quad (59)$$

$$\eta_i(\theta) = \frac{\lambda\beta_i(\overline{E_b}/2N_0)}{\sqrt{1+K}} - \sqrt{K}\cos\theta$$

and $\beta_i$; $\eta_i = 1,2,3$ are defined in equation 45. For the Rayleigh case one merely replaces $\xi_i$ and $\eta_i(\theta)$ of equation 59 by $$\xi_i = 1 - \sqrt{\pi}\,\eta_i\exp(\eta_i^2)\mathrm{erfc}\,\eta_i \quad (60)$$

$$\eta_i = \lambda\beta_i(\overline{E_b}/2N_0)$$

and performs the same minimizations required in equation 58.

Figure 9:
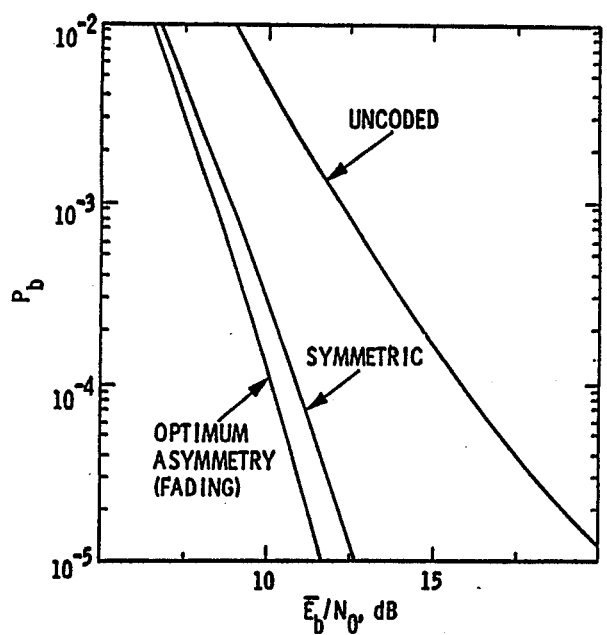
FIGS. 9 and 10 are graphs which illustrate the analogous results of FIGS. 7 and 8 for the case of no channel state, namely bit error probability performance vs. $\bar{E}_b/N_o$ for rate $\frac{1}{2}$ trellis coded QPSK in the presence of Rician fading; 2 states, K=10, and in the presence of Rayleigh fading; 2 states.
Figure 10:
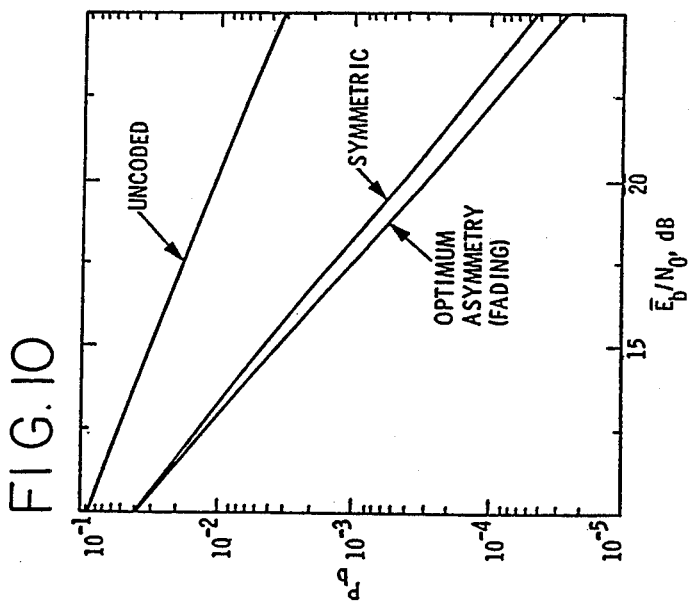

FIGS. 9 and 10 illustrate the analogous results to FIGS. 7 and 8 for the case where no channel state information is available. For simplicity of presentation, we have chosen not to illustrate the results for the values of optimum asymmetry determined from the no fading analysis since we have already made the point that asymmetry should be optimized in the fading environment. Clearly, the lack of channel state information produces a noticeable degradation in system performance. To quantitatively assess this additional degradation (at least for the Rayleigh channel), we now derive asymptotic results analogous to equations 49', 50', and 52' for the no channel state information case. In particular, we use the symptotic (large argument) expansion for erfc x, that is to say, $$\mathrm{erfc}\,x \simeq \frac{\exp(-x^2)}{\sqrt{\pi}\,x}[1 - \tfrac{1}{2}x^{-2}] \quad (61)$$

in which case equation 57 simplifies to $$\overline{D^{4\lambda\beta\rho}} \simeq \frac{1}{2[\lambda\beta(E_b/2N_0)]^2} \quad (62)$$

Figure 5:
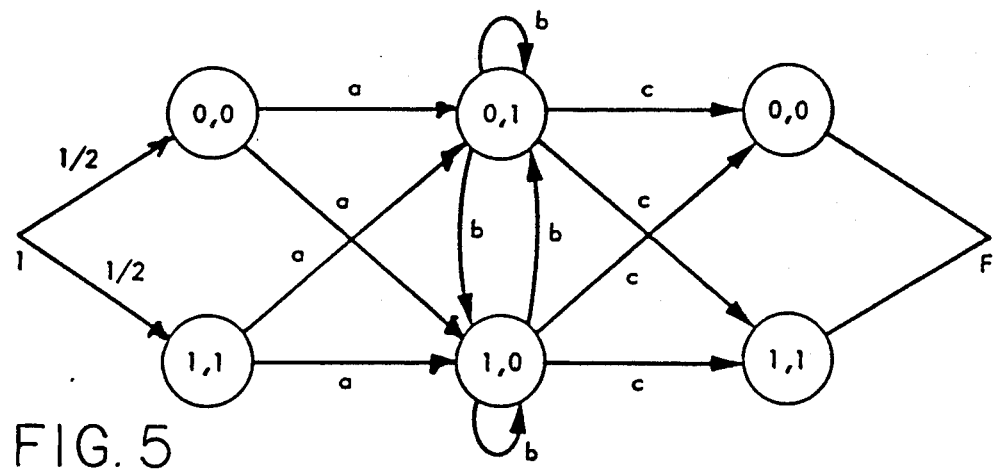
FIG. 5 illustrates a pair-state transition diagram for the trellis diagram of FIG. 4

Using the appropriate values of $\beta$ in equation 62, the branch gains of FIG. 5 become $$a = \frac{1}{4(2\lambda\overline{E_b}/N_0)^2}\exp(4\lambda^2\overline{E_b}/N_0) \quad (63)$$

$$b = \frac{1}{4\left(\frac{2\lambda\overline{E_b}/N_0}{1+\alpha}\right)^2}\exp\left(\frac{4\lambda^2\overline{E_b}/N_0}{1+\alpha}\right)$$

$$c = \frac{1}{4\left(\frac{2\alpha\lambda\overline{E_b}/N_0}{1+\alpha}\right)^2}\exp\left(\frac{4\alpha\lambda^2\overline{E_b}/N_0}{1+\alpha}\right)$$

Substituting equation 63 into the transfer function of equation 37a and performing the differentiation required in equation 35 gives the approximate upper bound on $P_b$ (valid for large $E_b/N_0$)

$$P_b \lesssim \min_\lambda \frac{\exp\left(\frac{4(1+2\alpha)}{1+\alpha}\lambda^2\overline{E_b}/N_0\right)}{4(2\gamma\overline{E_b}/N_0)^4\left(\frac{\alpha}{1+\alpha}\right)^2} \times \left\{1 - \frac{1}{2\left(\frac{2\gamma\overline{E_b}/N_0}{1+\alpha}\right)^2}\exp\left(\frac{4}{1+\alpha}\gamma^2\overline{E_b}/N_0\right)\right\}^{-2} \quad (64)$$

Performing the minimization over $\lambda$ required in equation 64 (actually the numerator is minimized since the denominator has little effect on this operation) gives $$\lambda_{opt} = \frac{1}{2\left(\frac{1+2\alpha}{1+\alpha}\right)(\overline{E_b}/N_0)} \quad (65)$$

which when substituted in equation 64 yields $$P_b \lesssim \left(\frac{1+2\alpha}{\alpha}\right)^2 \frac{e^2}{16(\overline{E_b}/N_0)^2} \quad (66)$$

Finally, the desired asymptotic results are $$P_b \lesssim \frac{9e^2}{16(\overline{E_b}/N_0)^2} \quad \text{(symmetric)} \quad (67)$$

$$P_b \lesssim \left(\frac{2\overline{E_b}/N_0 - \ln 3}{\overline{E_b}/N_0 - \ln 3}\right)^2 \frac{e^2}{16(\overline{E_b}/N_0)^2} \quad \text{(optimum asymmetry } - \text{no fading)}$$

$$P_b \lesssim \frac{e^2}{4(\overline{E_b}/N_0)^2} \quad \text{(optimum asymmetry } - \text{fading)}$$

Simulation Results

The results of a software simulation of the system block diagram of FIG. 1 which may be readily implemented by those skilled in the hardware art will now be described and presented. For the application at hand, the development of a simulation has manyfold purpose. First, it can be used to "verify" the theoretical results set forth above, keeping in mind that the simulation is indicative of the exact system performance whereas the theoretical bit error rate expressions are upper bounds. Second, when the number of states in the trellis diagram becomes large (e.g., 16), determining the state transition diagram and its associated transfer function is a tedious task; in such cases, simulation is the more expedient approach. Finally, system degradation due to the finite size of interleaving and decoder buffer imposed by the practical constraint on the allowable total delay is analytically intractable, particularly when coupled with that caused by the "noisy" carrier demodulation reference produced by the pilot tone extractor. Hence, to predict true system performance corresponding to the real world environment, one must again turn to simulation. In the next paragraph, we expand upon the last of these issues.

The block interleaver 11 of FIG. 1 can be regarded as a buffer with d rows which repressent the depth of interleaving and s columns which represent the span of interleaving. Thus, the size of the interleaver (in symbols) is d×s. Data is written into the buffer in successive rows and read out of the buffer (the order in which it is transmitted over the channel) in columns. At the receiver, the block deinterleaver 24 performs the reverse operation, i.e., the received soft quantized symbols are written into the buffer in successive columns and read out in rows. In practice, the interleaving depth should be chosen on the order of the maximum fade depth anticipated which, for the fading mobile satellite channel under investigation, depends on the doppler frequency or, equivalently, the vehicle speed. The smaller the doppler frequency, the longer the fade duration and vice versa. The interleaving span should be chosen on the order of the decoder buffer size. When this is done, the performance degradation (relative to that for the analytically tractable assumption of infinite interleaving depth and buffer size) will be inversely proportional to the product of interleaving size and doppler frequency.

On the other hand, when pilot tone(s) are used for coherent demodulation as suggested in FIG. 1, then performance will degrade directly proportional to doppler frequency. The reason for this is that the bandpass filter(s) used in the pilot tone extractor 22 to isolate the piolet tone(s) from the modulation must have bandwidth sufficiently wide to include the doppler shift. Thus, the larger the doppler, the wider the bandwidth of the filter(s) and hence the "noisier" the extracted demodulation reference. Assuming infinite interleaving and decoder buffer size, one can use the same analytical approach as previously discussed to derive upper bounds on the bit error probability in the presence of the noisy carrier reference. In particular, we first find the probability density function (p.d.f.) of the phase error associated with the demodulation reference signal which itself depends on the envelope of the fading sample. Next, the bit energy-to-noise ratio in the branch label gains (see FIG. 6 for example) should be degraded by the cosine of the phase error p.d.f., and then, as before, over the fading envelope p.d.f. Finally, using the averaged branch label gains in the transfer function bound $\overline{T}(D,I)$ gives the desired upper bound on average bit error rate. Even for the assumption of infinite interleaving and decoder buffer size, this computation is quite tedious. Thus, a simulation is preferable.

EXAMPLE 1

This example is for the verification of the analytical results obtained in the previous section. In particular, the system block diagram of FIG. 1 was simulated for a rate ½, 2-state trellis code, symmetric or optimum asymmetric QPSK modulation, and either a Rician or Rayleigh fading channel. The interleaving size was chosen equal to 512 QPSK symbols (or equivalently, 512 input bits) which, for all practical purposes, approximates infinite interleaving. A doppler frequency of 100 Hz was chosen which makes the channel rapidly varying enough for the fading to be assumed independent form symbol to symbol. These two assumptions provide a memoryless channel as assumed in the analysis. Furthermore, the buffer size was chosen equal to 32 bits which approximates the assumptions of an infinite bit buffer.

Numerical simulation results for this example are superimposed as dashed lines on the analytical results of FIG'S 6 and 7 corresponding respectively to the cases of Rician and Rayleigh fading with ideal channel state information. The discrepancy between the solid and dashed curves reflects the looseness of the upper bounds but the relative behavior of the analytical curves compares well with that of the simulation results.

EXAMPLE 2

Here we consider the more practical case of a rate ⅔, 16-state trellis code combined with symmetric BPSK modulation. It was shown by M. K. Simon and D. Divsalar in "Combined Trellis Coding with Asymmetric MPSK Modulation," cited above, that for this case the additional coding gain produced by the addition of asymmetry to the modulation is small and thus we have chosen to ignore it. Although, with much computational effort and the assumption of infinite interleaving and buffer size, this system can be analyzed by the approach taken in the previous section, our interest here lies in computing the performance with limited interleaving and decoder buffer size as follows.

At the present time, this system is a candidate for National Aeronautics and Space Administration's Mobile Satellite Experiment (MSAT-X) project whose objective it is to transmit 4800–9600 bps of digitally encoded speech over a 5 kHz RF channel with a bit error rate of $10^{-3}$. To satisfy the previously mentioned constraint on total allowable delay, the interleaving size, interleaving depth, and decoder buffer size have been optimized at this bit error rate to achieve the minimum bit signal-to-noise ratio. For the specified delay constraint (60 ms), the size of the block interleaver and deinterleaver have been chosen equal to 128 BPSK symbols (or 256 input bits). With the above chosen interleaving size, the interleaving depth has been optimized by computer simulation and found to be equal to 16 symbols. Thus, the interleaving span is 128/16=8 symbols over the range of doppler frequencies from 20 Hz to 100 Hz (vehicle speeds of 15 mph to 75 mph at UHF). Note, however, that for MSAT-X channels operating at low doppler frequencies such as 20 Hz, we can indeed have fade durations much longer than 16 symbols. In this case, an interleaving size of 128 symbols is not sufficient and, as we shall see shortly, a significant performance penalty occurs. Finally, with the above delay constraint imposed, the buffer size was optimized through simulation and found to be 32 symbols (or 64 bits).

Figure 11:
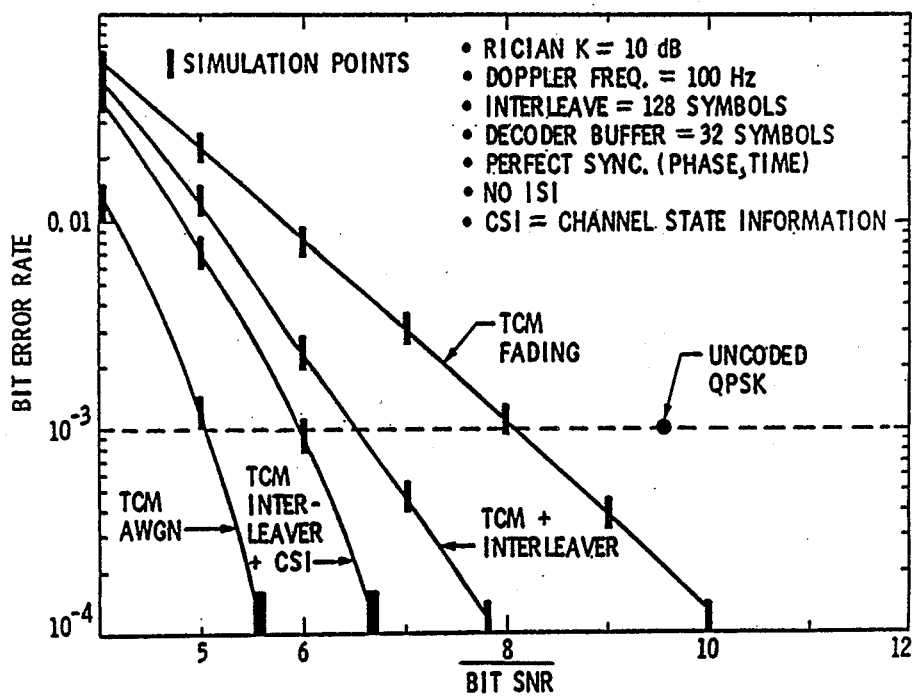
FIG. 11 illustrates the results of the simulation of $\frac{2}{3}$, 16 state trellis coded 8-PSK modulation (TCM) over a Rician fading channel.
Figure 12:
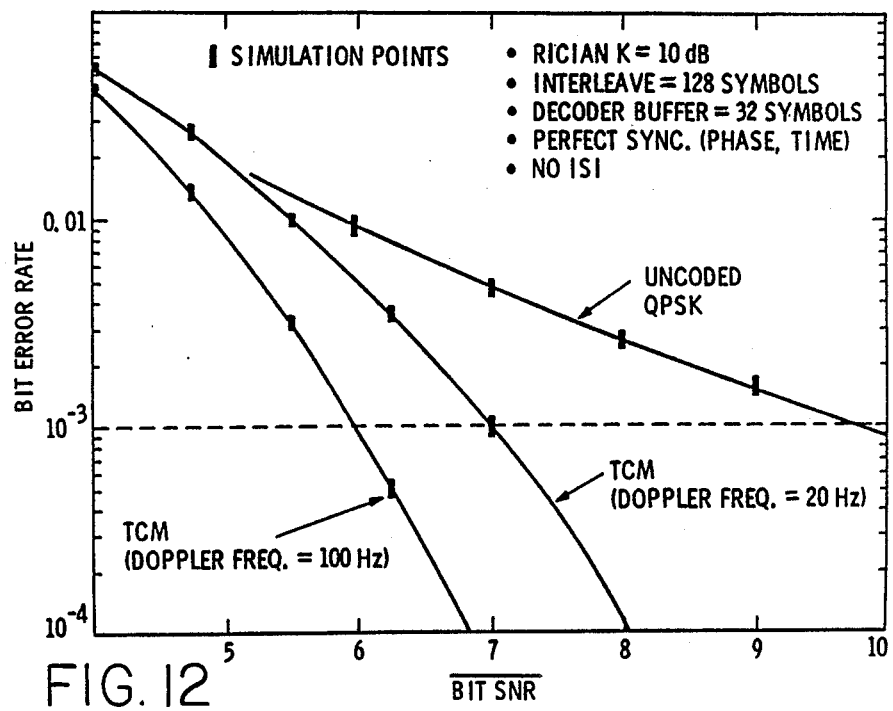
FIG. 12 illustrates the effect of the doppler frequency on the results of the stimulation of $\frac{2}{3}$, 16 state trellis coded 8-PSK modulation over a Rician fading channel with channel state information (CSI) and the same interleaving parameters as in FIG. 11.

FIGS. 11 and 12 illustrate the results of the simulation for perfect carrier and time synchronization and no intersymbol interferences (ISI). In particular, FIG. 11 assumes a fixed doppler frequency of 100 Hz, a fixed Rician parameter K=10, and various interleaving and channel state information options. Also shown as a reference point, is the performance of uncoded QPSK (same bandwidth as rate ⅔ trellis coded 8 PSK) at the chosen error rate of $10^{-3}$. FIG. 12 shows the effect of doppler frequency on system performance for the case of ideal channel state information and the same interleaving parameters as in FIG. 11.

FIG. 13 summarizes in a table the above results by tabulating the required $E_b/N_o$ at a bit error rate of $10^{-3}$ for each of the cases and also for Rician fading parameters of 5 and 6 dB. From these numerical results, one can assess the coding gain (reduction in required $E_b/N_o$ relative to uncoded QPSK) achieved in each case. For example, without interleaving and channel state information, transmitting ⅔ coded 8 PSK over the K=10 Rician channel produces a coding gain of 1.6 dB. When 128 symbol interleaving is added, the coding gain is increased to 3.1 dB. If, in addition to interleaving, we provide ideal channel state information, another 0.5 dB coding gain is achieved which brings the total coding gain to 3.6 dB in this particular environment. As is obvious from FIG. 11, this coding gain would be greater at lower bit error rates. When the doppler is decreased from 100 Hz to 20 Hz, FIG. 12 and the table of FIG. 13 show a reduction in coding gain of 1 dB due to the limitation on the size of the interleaver.

As previously mentioned, all of the results in FIGS. 11 and 12, and the table of FIG. 13 are for the case of perfect carrier synchronization. Using dual tone calibration technique (DTCT), wherein two tones of equal power are inserted symmetrically at the edges of the data spectrum for the purpose of coherent demodulation, we have found by simulation that the noisy carrier reference produced by the appropriate pilot tone extractor produces about a 2 to 3 dB degradation in performance depending on the value of the Rician parameter K. This is caused by the fact that the bandwidth of the pilots tone bandpass filters has to be chosen wide enough to accommodate the maximum doppler of 100 Hz and the total power of the two pilots is 7 dB below that of the data (this ratio has been shown to be optimum). Simulation results with the DTCT technique are shown in FIG. 14 for Rayleigh and various Rician channels under the assumption of ideal channel state information, 128 symbol interleaving, and a doppler frequency of 20 Hz (worst case for our application). Note that in this simulation, the bandwidth of the pilot bandpass filters was chosen to accommodate the 100 Hz doppler as would be the case in the actual hardware design.

From the foregoing, it is evident that there is provided a new and improved method of communication over a fading mobile channel which uses conventional trellis coding and conventional multiple phase shift keyed (MPSK) signaling with asymmetry (nonuniform) spacing in the phases of the MPSK signal set. This basic method may be readily implemented with conventional equipments using state of the art techniques. For example, the asymmetry in MPSK may be readily implemented using a read only memory (ROM) mapper. Trellis coded modems are known to tolerate more than twice as much noise as conventional modems at the same block error rate, and provide significantly higher throughput by reducing the error rate by about three orders of magnitude, but that is through a nonfading telephone channel. The present invention provides reliable, high quality digital voice and data transmission in a fading communication channel, such as a mobile satellite channel, where land mobile receivers are expected to experience severe fading conditions while in use as the mobile receiver moves through varying terrain.

What is claimed is:

1. A method of communication with a mobile receiver over a fading mobile-satellite channel for digital coded voice and data comprising the steps of trellis coding said data at a transmitter, block interleaving said trellis coded data, and multiple phase-shift-keyed signaling the trellis coded and block interleaved data with constant amplitude and distinct phase spacing in a signal set of phases greater than four, and thereafter quadrature modulating the result on an IF carrier and modulating the modulated IF carrier on an RF carrier for transmission through said mobile-satellite channel and including the step of inserting two pilot tones in the modulated IF carrier for use in synchronous demodulation of the IF carrier at said mobile receiver, and further including the steps at said mobile receiver of extracting said pilot tones, using said pilot tones for synchronous demodulation of said IF carrier to coherently detect received trellis coded data, block deinterleaving detected trellis coded data, and decoding the deinterleaved trellis coded data, said demodulating step including the steps of recovering information from extracted pilot tones for use as side information in said deinterleaved trellis decoding step.

2. A method as defined in claim 1 wherein said signal set is comprised of eight distinct phases.

3. A method as defined in claim 1 wherein channel state information is derived from said pilot tones at said receiver in the form of a fading channel parameter, $\rho_n$, for use as side information, $z_n$, in the step of trellis decoding, and the decoding process uses a metric of the form $m(y_n, x_n; z_n) = -|y_n - \rho_n x_n|^2$ for improving the error correction performance of the trellis decoding in the presence of channel fading.

4. Apparatus for communication with a mobile receiver over a fading mobile-satellite channel for digital coded voice and data comprising means for trellis coding said data, means for block interleaving said trellis coded data, means for multiple phase-shift-keyed signaling said trellis coded and block interleaved data with constant amplitude and distinct phase spacing in a signal set of phases greater than four, means for quadrature modulating the multiple phase-shift-keyed trellis encoded data on an IF carrier, means for inserting two pilot tones in the modulated IF carrier, and means for modulating the modulated IF carrier on an RF carrier for transmission through said mobile-satellite channel, and including means at said mobile receiver for synchronous demodulating of the IF carrier comprising means for extracting said two pilot tones, means for demodulating said IF carrier using said pilot tones to coherently detect said trellis coded data, means for block deinterleaving said trellis coded data, and means for decoding said deinterleaved trellis coded data, said demodulating means including means for recovering information for extracted pilot tones for use as side information in said deinterleaved trellis decoding means.

5. Apparatus as defined in claim 4 wherein said signal set is comprised of eight distinct phases.

6. Apparatus as defined in claim 4 including means for deriving channel state information from said pilot tones at said receiver in the form of a fading channel parameter, $p_n$, for use as side information, $z_n$, in said means for trellis decoding, and said decoding means uses a metric of the form $m(y_n, x_n; z_n) = -|y_n - \rho_n x_n|^2$ for improving the error correction performance of said trellis decoding means in the presence of channel fading.

* * * * *